United States Patent [19]

Yamamoto et al.

[11] 4,019,469
[45] Apr. 26, 1977

[54] INTAKE MEANS FOR ROTARY PISTON ENGINES

[75] Inventors: Kenichi Yamamoto, Hiroshima; Kuniaki Kakui, Minamishowa, both of Japan

[73] Assignee: Toyo Kogyo Co., Ltd., Japan

[22] Filed: Feb. 27, 1976

[21] Appl. No.: 662,274

[30] Foreign Application Priority Data

Mar. 26, 1975 Japan .................. 50-37245

[52] U.S. Cl. .......................................... 123/8.13
[51] Int. Cl.[2] ...................................... F02B 53/10
[58] Field of Search ............ 123/8.09, 8.13, 8.45; 418/61 A

[56] References Cited

UNITED STATES PATENTS

| | | | |
|---|---|---|---|
| 3,075,505 | 1/1963 | Froede et al. | 123/8.45 |
| 3,103,208 | 9/1963 | Price et al. | 123/8.13 |
| 3,915,126 | 10/1975 | Kishimoto et al. | 123/8.13 |

Primary Examiner—Carlton R. Croyle
Assistant Examiner—Michael Koczo, Jr.
Attorney, Agent, or Firm—Fleit & Jacobson

[57] ABSTRACT

Rotary piston engine has an intake port formed in one of the side housings, said intake port being connected with an intake passage which has a curved portion merging to the intake port. The radius of curvature of the curved portion is varied in widthwise direction of the passage with smaller radius at the side opposite to the direction of rotor rotation whereby the difference in flow resistance thus produced effectively bends the direction of mixture flow towards the direction of rotor rotation to establish recommendable stratified fuel distribution.

8 Claims, 9 Drawing Figures

FIG.1 PRIOR ART
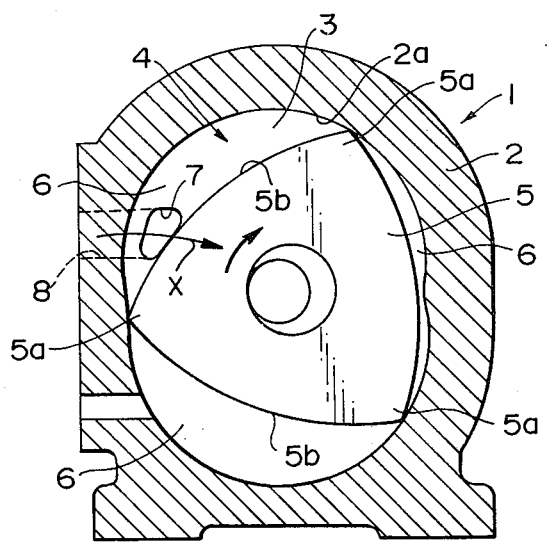
FIG.2 PRIOR ART
(I) 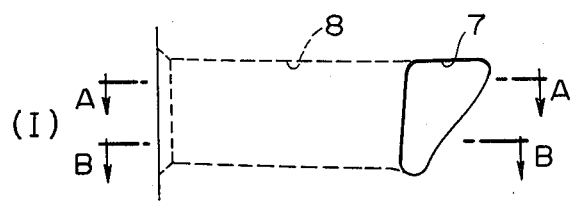
(II) 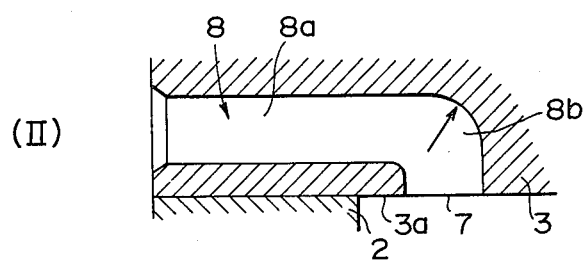
(III) 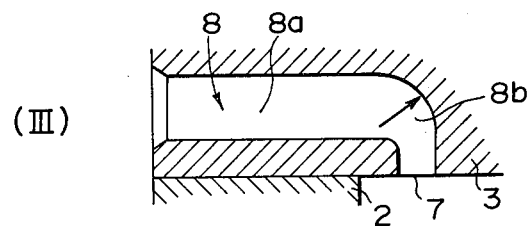

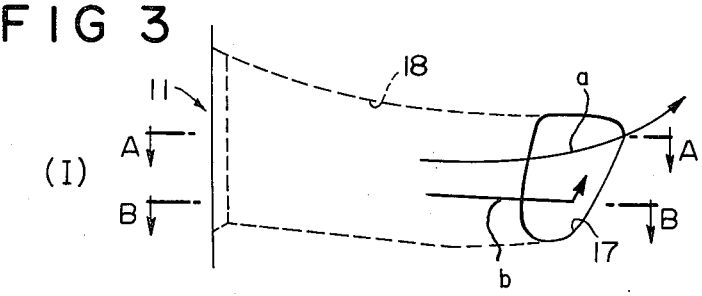
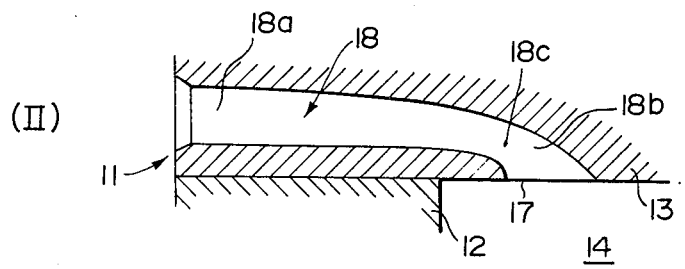
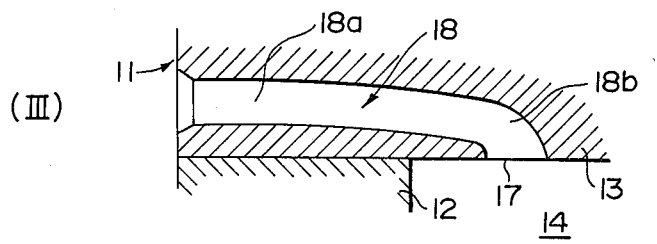
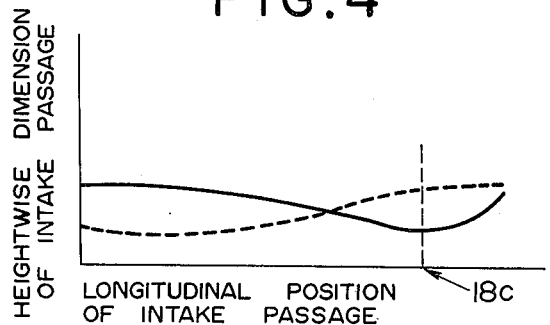

INTAKE MEANS FOR ROTARY PISTON ENGINES

The present invention relates to rotary piston type internal combustion engines and more particularly to intake means therefor.

In rotary piston type engines comprising a casing which includes a rotor housing having a multi-lobed trochoidal inner wall and a pair of side housings secured to the opposite sides of the rotor housing so as to define a rotor chamber therein, a substantially polygonal rotor disposed in said rotor chamber for rotation and revolution with apex portions in sliding contact with the trochoidal inner wall of the rotor housing so as to define working chambers of variable volume between the inner wall of the rotor housing and flanks of said rotor, intake port means is formed in either or both of the rotor and side housings and the present invention specifically pertains to this type of rotary piston engines having intake port means in at least one of the side housings.

An intake port formed in the side housing, hereinafter referred to as "side intake port", has conventionally been connected with an intake passage which is formed in the associated side housing and has a substantially straight portion extending substantially parallel with the inner wall surface of the side housing and a curved portion connecting the straight portion with the intake port. The straight portion generally extends substantially parallel with the minor axis of the trochoid and has a width in the direction of the major axis thereof. The curved portion has a radius or average radius of curvature which is substantially uniform in the direction of the width of the passage so that intake air-fuel mixture is introduced into the intake working chamber in a direction substantially parallel with the minor axis of the trochoid to form a relatively fuel rich mixture in the trailing side of the working chamber, that is, the side opposite to the direction of rotation of the rotor. This arrangement is objectionable, however, since in the rotary piston engine of the aforementioned type there is a tendency in the working chamber that combustion flame propagates from the trailing side of the working chamber toward the leading side so that mixture is not adequately burnt at the trailing side. Therefore, it is recommendable to establish a stratified fuel distribution in such a manner that a relatively rich mixture is formed in the leading side of the working chamber.

The present invention has therefore an object to provide rotary piston engines having intake means by which relatively rich fuel distribution can be attained at the leading portion of the intake working chamber.

Another object of the present invention is to provide an intake system for rotary piston engines, which is so arranged as to direct air-fuel mixture toward the leading portion of the intake working chamber.

A further object of the present invention is to provide rotary piston engines having side intake port means for introducing air-fuel mixture into the intake working chamber and directing it toward the leading portion thereof.

According to the present invention, the above and other objects can be accomplished by a rotary piston engine comprising a casing which includes a rotor housing formed with an inner wall of multi-lobed trochoidal configuration having a major axis and a minor axis and a air of side housings secured to the opposite sides of the rotor housing so as to define a rotor chamber therein, a substantially polygonal rotor disposed in said rotor chamber for rotation and revulotion with apex portions in sliding contact with the trochoidal inner wall of the rotor housing so as to define working chambers of variable volume between the inner wall of the rotor housing and flanks of said rotor, intake port means including at least one intake port formed in at least one of the side housings and opening to the rotor chamber at one of the working chambers which is in intake stroke and an intake passage formed in said one of the side housing, said intake passage including a curved portion leading to the intake port and having a radius of curvature which varies widthwise of the passage to provide varying resistance to mixture flow passing therethrough so that the mixture flow is given with a velocity component in the direction of rotation of the rotor. The radius of curvature of the intake passage may be represented by that of the passage wall which is located outboard side of the curvature, and the radius of curvature may be so varied along the width of the passage in such a manner that the radius increases in the direction of the rotor rotation. The curvature radius may be constant along the length of the passage in a plane extending in longitudinal and thicknesswise direction of the passage, but the radius may be changed in the plane. Since a small radius of curvature provides a large flow resistance, the above configuration of the intake passage is effective to distort the intake mixture flow to the direction of rotor rotation, that is, toward the leading portion of the intake working chamber. In order to enhance the effect of distorting the intake mixture flow, the intake passage may also be curved in the vicinity of the intake port so as to be directed to some extent in the direction of rotor rotation.

The above and other objects and features of the present invention will become apparent from the following descriptions of preferred embodiments taking reference to the accompanying drawings, in which:

FIG. 1 is a sectional view showing a general arrangement of a conventional rotary piston engine;

FIG. 2(I) is a fragmentary view of one of side housings showing a typical arrangement of a conventional side intake port;

FIG. 2(II) is a sectional view taken substantially along the line A—A in FIG. 2(I);

FIG. 2(III) is a sectional view taken substantially along the line B—B in FIG. 2(I);

FIG. 3(I) is a view similar to FIG. 2(I) but showing the side intake port arrangement in accordance with one embodiment of the present invention;

FIG. 3(II) is a sectional view taken substantially along the line A—A in FIG. 3(I);

FIG. 3(III) is a sectional view taken substantially along the line B—B in FIG. 3(I);

FIG. 4 is a diagram showing the change in height of the intake passage portion leading to the intake port; and, FIG. 5 is a sectional view of a rotary piston engine which includes the intake system in accordance with one embodiment of the present invention.

Figure 5:
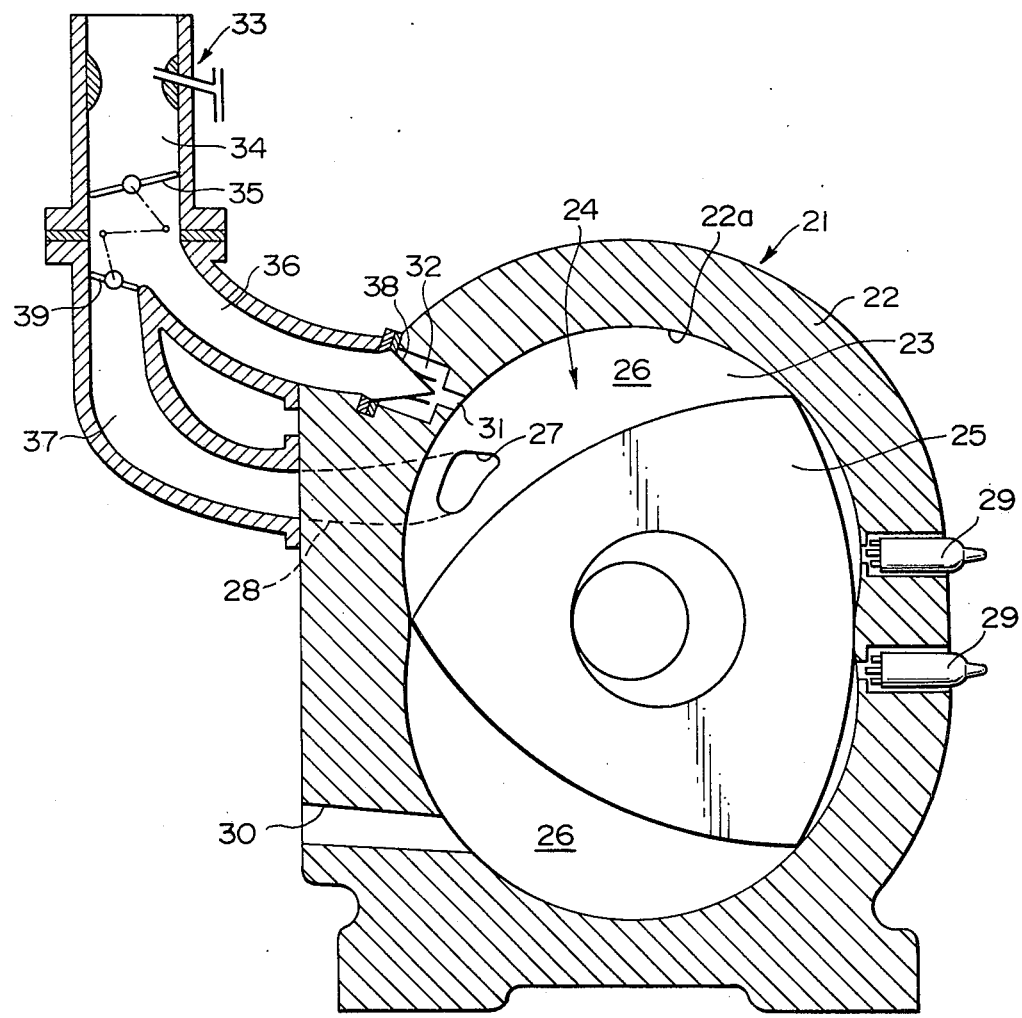

Referring to the drawings, particularly to FIG. 1, there is shown a rotary piston engine of conventional type which comprises a casing 1 including a rotor housing 2 and a pair of side housings 3 secured to the opposite sides of the rotor housing 2. The rotor housing 2 has an inner wall 2a of two-lobed trochoidal configuration so that a rotor chamber 4 is defined in the casing 1. A substantially triangular rotor 5 is disposed in the rotor chamber 4 for rotation and revolution with apex portions 5a in sliding contact with the inner wall 2a of the rotor housing 2. Thus, a working chamber 6 is defined between each flank 5b of the rotor 5 and the inner wall 2a of the rotor housing 2. As the rotor 5 rotates in the direction shown by an arrow in FIG. 1, each of the working chamber 6 is subjected to a cyclic volumetric change so as to conduct an intake, compression, expansion and exhaust strokes.

One of the side housings 3 is formed with an intake port 7 which opens to the rotor chamber 4 to communicate with one of the working chambers 6 which is in the intake stroke. The intake port 7 is connected to an intake passage 8 which is formed in the side housing 3 and extending substantially parallel with the minor axis of the trochoid. Referring to FIG. 2, it will be seen that the intake passage 8 has a straight portion 8a which extends substantially parallel with the inner wall surface of the side housing 3, and a curved portion 8b connecting the straight portion 8a with the intake port 7. The curved portion 8b has a radius of curvature as represented by the curvature radius at the outboard wall which is substantially uniform throughout the width of the passage 8.

The curved portion 8b therefore provides a substantially uniform resistance to mixture flow passing therethrough throughout the width thereof. Further, the passage 8 extends substantially parallel with the minor axis of the trochoid so that the mixture is introduced through the intake port 7 into the intake working chamber in a direction having a velocity component parallel to the rotor shaft axis as well as substantially parallel to the minor axis of the trochoid as shown by an arrow X in FIG. 1. This is disadvantageous because there is a tendency that rich mixture is formed in the trailing part of the intake working chamber 6 as described before.

Referring now to FIGS. 3 and 4 which show an embodiment of the present invention, the casing 11 of the engine includes a rotor housing 12 and a pair of side housings 13, only one of which is shown in the drawing. The side housing 13 is formed with an intake port 17 formed at the inner wall surface thereof to open the rotor chamber 14 and communicating with an intake passage 18 formed in the side housing 13.

As in the previous embodiment, the intake passage 18 comprises a substantially straight portion 18a and a curved portion 18b connecting the straight portion 18a with the intake port 17. The widthwise direction of the passage 18 is shown as the direction along the cross-section 18 shown in FIG. 3(I). The heightwise or thicknesswise direction is shown as the direction along the cross-section 18 shown in FIG. 3(II). The curved portion 18b has a radius of curvature as measured at the outboard side of the passage wall, which changes widthwise of the intake passage 18. More specifically, as shown in FIGS. 3(II) and (III), the radius of curvature of the portion 18b is increased widthwise in the direction of the rotor rotation. In other words, the curved portion 18b has a greater curvature radius at the leading or advanced side of the intake passage 18 in terms of the direction of rotor rotation than at the trailing or retarded side. It is preferable that the curvature radius is changed gradually from one side to the other of the passage, but there may be abrupt or discontinuous change in the radius. This change of curvature radius provides a corresponding change in the resistance to mixture flow at the intake port 17, whereby the direction of mixture flow is bent in the direction of rotor rotation and the mixture flow is introduced into the leading part of the working chamber.

In the illustrated embodiment, the intake passage 18 is reduced in heightwise or thicknesswise dimension at a longitudinal section passing through the leading side of the passage as shown by 18c in FIG. 3(II). The change in height of the passage 18 at the longitudinal section A—A in FIG. 3(I) is shown by the solid line in FIG. 4. Further, the heightwise dimension of the passage 18 is gradually increased as shown by the dotted line in FIG. 4 at the trailing side of the passage 18. Therefore, the mixture flow is accelerated at the reduced part 18c and, in the area adjacent to the reduced part 18c, the mixture flow is distorted under the influence of the accelerated mixture flow toward the leading side, that is, in the direction shown by an arrow a in FIG. 3(I). The increased heightwise dimension in the trailing part of the passage 18 is effective to avoid undue increase of the flow resistance in that region. Further, the small radius of curvature at the curved portion 18b in the trailing part of the passage 18 provides an increased resistance to mixture flow passing therethrough with the result that the direction of the mixture flow is bent or distorted toward the leading side as shown by an arrow b in FIG. 3(I). Thus, the configuration of the intake passage 18 has been found as being particularly effective to direct the intake air-fuel mixture to the leading part of the intake working chamber producing a stratified condition of fuel distribution with relatively rich mixture at the leading part. Due to the establishment of this stratified fuel distribution, stable ignition and combustion of air-fuel mixture in the working chamber can be ensured throughout the operating range of the engine with minimum fuel consumption and restricted pollutant emissions.

In the embodiment shown in FIG. 3, the intake passage 18 is further curved slightly in a plane perpendicular to the axis of rotor rotation toward the direction of rotor rotation as shown by dotted lines in FIG. 3(I). This configuration of the intake passage 18 further assist the mixture flow to be directed toward the leading part of the intake working chamber to enhance the establishment of the stratified fuel distribution.

FIG. 5 shows a rotary piston engine which has a side intake port system in accordance with the present invention and a further intake port system provided in the rotor housing. As usual, the rotary piston engine comprises a casing 21 including a rotor housing 22 having an inner wall 22a of trochoidal configuration and a pair of side housings 23 secured to the opposite sides of the rotor housing 23 to define a rotor chamber 24 in the casing 21. A substantially triangular rotor 25 is disposed for rotation and revolution in the rotor chamber 24 as well known in the art to define working chambers 26 of variable volume. The rotor housing 22 is formed with an exhaust port 30 opening to the rotor chamber 24 at the exhausting working chamber 26. Further, the rotor chamber 22 is provided with a pair of ignition plugs 29 in a manner well known in the art.

One of the side housings 23 is provided with a side intake port 27 opening to the intake working chamber 26 and communicating with an intake passage 28 formed in the side housing 23. The port 27 and the passage 28 are formed as discussed above so as to direct the mixture flow toward the leading part of the intake working chamber 26. In the illustrated embodiment, a second intake port 31 is provided in the rotor housing 22. The port 31 may be referred to as a peripheral intake port and communicates with an intake port chamber 32 formed in the rotor chamber 22.

The engine includes a carburetor which has a main passage 34 provided with a throttle valve 35. The main passage 34 is branched into two passages 36 and 37 which are respectively connected with the intake port chamber 32 and the side intake port 37. A reed type check valve 38 is provided in the chamber 32 so that the mixture is allowed to flow from the branch passage 36 to the chamber 32 but prevented to flow in the opposite direction. The branch passage 37 is provided with a shut-off valve 39 which is interconnected with the throttle valve 35 so that it is closed during light load operation of the engine.

The peripheral intake port 31 is located in such a position that it is opened at an advanced timing as compared with the side intake port 27 and has an effective port area which is small in relation to that of the side intake port 27. Further, the port 31 is so directed that it discharges mixture toward the leading part of the intake combustion chamber 26. Under light load engine operation, the shut-off valve 39 is closed and air-fuel mixture is introduced into the intake working chamber 26 only through the peripheral intake port 31. Under medium and heavy load engine operation, the shut-off valve 39 is opened and air-fuel mixture is introduced into the intake working chamber 26 both through the peripheral intake port 31 and the side intake port 27. The intake system as employed in the illustrated embodiment is thus effective in producing stratified fuel distribution with richer mixture in the leading part of the intake working chamber.

The invention has thus been shown and described with reference to the accompanying drawings, however, it should be noted that the invention is in no way limited to the details of the illustrated structures but changes and modifications may be made without departing from the scope of the appended claims.

We claim:

1. Rotary piston engine comprising a casing which includes a rotor housing formed with an inner wall of multi-lobed trochoidal configuration having a major axis and a minor axis and a pair of side housings secured to the opposite sides of the rotor housing so as to define a rotor chamber therein, a substantially polygonal rotor disposed in said rotor chamber for rotation and revolution with apex portions in sliding contact with the trochoidal inner wall of the rotor housing so as to define working chambers of variable volume between the inner wall of the rotor housing and flanks of said rotor, intake port means including at least one intake port formed in at least one of the side housings and opening to the rotor chamber at one of the working chambers which is in intake stroke and an intake passage formed in said one of the side housings, said intake passage including a curved portion leading to the intake port and having a radius of curvature which varies widthwise of the passage to provide varying resistance to mixture flow passing therethrough so that the mixture flow is given with a velocity component in the direction of rotation of the rotor.

2. Rotary piston engine in accordance with claim 1 wherein the radius of curvature of the passage curved portion varies in such a manner that it increases in the direction of the rotor rotation.

3. Rotary piston engine in accordance with claim 1 wherein said curved portion is reduced in thicknesswise dimension at a region which is in the side of the direction of rotor rotation so that mixture flow speed is accelerated at said reduced region.

4. Rotary piston engine in accordance with claim 3 wherein the curved portion is increased in thicknesswise dimension at a part which is in the side opposite to the direction of rotor rotation.

5. Rotary piston engine in accordance wih claim 1 wherein said intake passage is curved in a widthwise plane toward the direction of rotor rotation so that the mixture is further given with a velocity component in the direction of the rotor rotation.

6. Rotary piston engine in accordance with claim 1 wherein said rotor housing is provided with second intake port means and means is provided to interrupt supply of air-fuel mixture to the first intake port means during light load operation of the engine.

7. Rotary piston engine in accordance with claim 6 wherein said second intake port means has an effective port area which is smaller than that of the first intake port means.

8. Rotary piston engine in accordance with claim 6 wherein said second intake port means is so located that it is opened earlier than the first intake port means.

* * * * *